(12) United States Patent
Cash

(10) Patent No.: US 7,975,653 B2
(45) Date of Patent: Jul. 12, 2011

(54) BIRD WASTE CATCHER FOR CAGE DOOR

(76) Inventor: Karen Cash, Redmond, WA (US)

( * ) Notice: Subject to any disclaimer, the term of this patent is extended or adjusted under 35 U.S.C. 154(b) by 273 days.

(21) Appl. No.: 12/385,304

(22) Filed: Apr. 3, 2009

(65) Prior Publication Data

US 2009/0250013 A1   Oct. 8, 2009

Related U.S. Application Data

(60) Provisional application No. 61/064,979, filed on Apr. 7, 2008.

(51) Int. Cl.
*A01K 31/04* (2006.01)
(52) U.S. Cl. .......... 119/467; 119/479
(58) Field of Classification Search ............ 119/467, 119/463, 464, 51.01, 61.1, 429, 454, 469, 119/475, 477, 479; 220/480–482, 479, 476; 248/213.2, 310
See application file for complete search history.

(56) References Cited

U.S. PATENT DOCUMENTS

| | | | |
|---|---|---|---|
| 439,298 A * | 10/1890 | Hutter | 119/61.1 |
| 1,753,674 A | 4/1930 | Tullis | |
| 1,798,984 A * | 3/1931 | Petersen | 119/61.1 |
| 2,045,472 A | 6/1936 | Kearney et al. | |
| 2,120,262 A | 6/1938 | Rodess | |
| 2,477,509 A * | 7/1949 | Burgesser | 211/88.03 |
| 2,675,782 A * | 4/1954 | Lage | 119/61.1 |
| 2,754,991 A * | 7/1956 | Hagerty et al. | 220/481 |
| D255,271 S | 6/1980 | Voss | |
| 5,201,278 A | 4/1993 | Hehn | |
| 5,305,902 A * | 4/1994 | Vozick | 220/23.4 |
| 5,694,884 A | 12/1997 | Eicoff | |
| 5,694,885 A * | 12/1997 | Deitrich et al. | 119/477 |
| 6,129,052 A | 10/2000 | Huang | |
| 6,199,510 B1 * | 3/2001 | Louden | 119/51.01 |
| 6,269,775 B1 | 8/2001 | Watts | |
| 6,283,062 B1 | 9/2001 | King | |
| 6,311,643 B1 | 11/2001 | Christian et al. | |
| 6,394,034 B2 | 5/2002 | Watts | |
| 6,431,386 B1 * | 8/2002 | Hofman et al. | 220/481 |
| 7,185,611 B2 | 3/2007 | Schrader | |
| 7,513,219 B2 * | 4/2009 | Louden | 119/477 |

* cited by examiner

*Primary Examiner* — Rob Swiatek
*Assistant Examiner* — Kristen C Hayes
(74) *Attorney, Agent, or Firm* — Richard C. Litman

(57) ABSTRACT

The bird waste catcher for a cage door is a device that is adapted for mounting on the door of a standard wire mesh birdcage. A pair of brackets attaches to the cage door with nuts and bolts and supports a detachable receptacle. The receptacle is mounted on the door of the birdcage for catching excrement and other debris created by a pet bird perched on top of the birdcage door.

10 Claims, 5 Drawing Sheets

BIRD WASTE CATCHER FOR CAGE DOOR

CROSS-REFERENCE TO RELATED APPLICATION

This application claims the benefit of U.S. Provisional Patent Application Ser. No. 61/064,979, filed Apr. 7, 2008.

BACKGROUND OF THE INVENTION

1. Field of the Invention

The present invention relates to pet cages and accessories and, more particularly, to a bird waste catcher for a cage door that mounts on the door of a wire mesh birdcage and catches bird excrement and other debris when a bird is perched on the top of the birdcage door.

2. Description of the Related Art

Between approximately ten and seventeen million birds are kept as pets in the United States. Birds are the third most popular companion pet, behind dogs and cats. On average, five percent of all households own at least one bird. Bird ownership is particularly favored among persons who live in smaller homes, such as apartments, condominiums and mobile homes.

Keeping a bird as a pet poses different challenges for a pet owner than keeping a dog or a cat. Many birds that are kept as pets, such as parrots, are highly intelligent and social animals. Many researchers equate their intellectual and emotional capabilities to that of a two to five year old child, depending on the species. Some birds have very complex psychological and physical care needs. Additionally, birds have the ability to fly.

Even though birds are intelligent and social animals, most experts agree that birds, such as parrots, are not as fully domesticated as dogs or cats. This can pose challenges for a bird owner that are not faced by a dog or cat owner with respect to housebreaking and cleanliness issues.

While many bird information websites and breeders assert that pet birds, such as parrots, can be housebroken or trained like a cat or dog, most experts state that potty training a bird is a difficult process that is not always successful. As a consequence, most birds are housed in cages.

Typically, birdcages are made from wire mesh and range in size from a few square inches for small birds, such as finches and parakeets, to very large and elaborate cages for large birds like parrots. A problem associated with the use of wire mesh birdcages is that the bird has a tendency to scatter debris outside the perimeter of the cage. The floor area directly around the cage then becomes littered with food, excrement, bedding chips and other debris from inside the cage.

A variety of aprons, skirts and other cage guards have been developed to address the problem of debris. Most of the aprons and skirts consist of a platform that extends around the perimeter of the cage or a flat sheet that attaches around the perimeter of the cage and can be removed for easy cleaning by the owner. Cage aprons and skirts are quite effective at preventing excrement and other debris from scattering onto the floor around the cage, even when the bird is climbing on the outside of the cage or perched on top of it, as most bird owners permit their pets to do for exercise and play.

On large cages for large birds, the cage door opening can be quite large as well. When a large bird, such as a parrot, is outside of the cage, the open cage door very often becomes a favorite perch. Because the open door extends beyond the perimeter of the cage apron or skirt, the pet owner is required to put newspaper or mats on the floor directly below the cage door, where the bird waste is subject to being stepped in by other pets or small children. Additionally, water and food dispensers are often attached to the cage door, where they can become soiled by a bird perched atop the cage door, requiring the owner to constantly monitor or clean them. There is also no protection for the latches and handles on the cage door.

Thus, a bird waste catcher for a cage door solving the aforementioned problems is desired.

SUMMARY OF THE INVENTION

The bird waste catcher for a cage door is a device that mounts to the door of a birdcage and prevents excrement and other debris from falling around a birdcage when a bird is perched on the birdcage door.

The bird waste catcher for cage door has a pair of brackets for mounting on the door of a standard wire mesh birdcage door. The brackets have an inverted "T" shape, and have a horizontal lip on the upper edge. A receptacle with an open top has slots on the rear surface that fit on the lip of the brackets. This allows a pet owner to easily detach the receptacle for cleaning. The brackets may be mounted to either side of the cage door. The device may be sold as a pair and have receptacles mounted on both sides of the cage door. The bird waste catcher for cage door prevents excrement and debris from falling on the floor and from contaminating food and water bowls that might be mounted on the door of the birdcage when a bird is perched on the top of the birdcage door.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
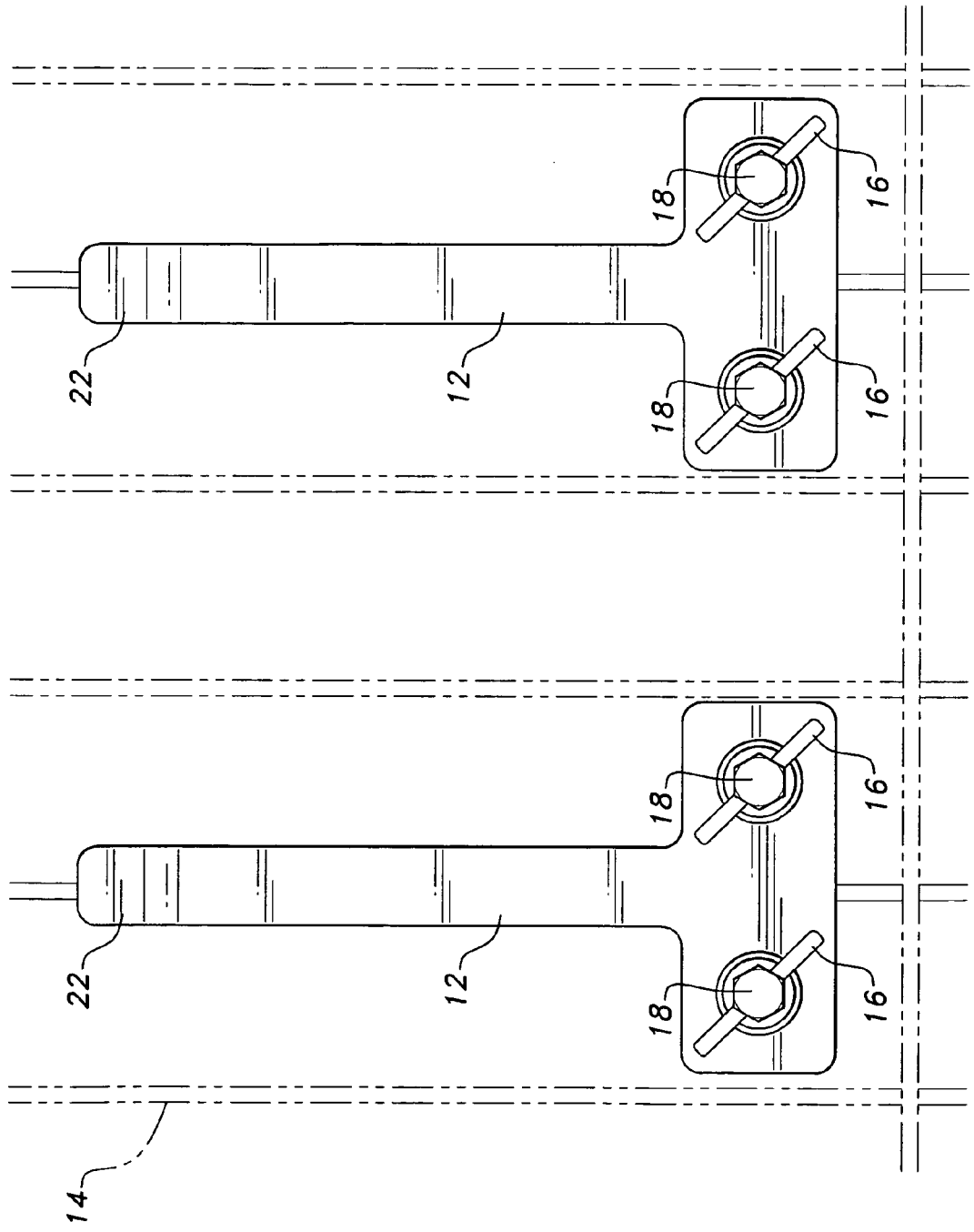
FIG. 1 is a front view of the bracket members of a bird waste catcher for cage door according to the present invention.

The present invention relates to a bird waste catcher for a cage door, hereinafter designated generally as 10 in the drawings. The device is adapted for mounting onto a birdcage door to prevent the scattering of bird waste and other debris when a bird is perched on top of a birdcage door.

FIG. 1 is a front view of brackets 12 for the bird waste catcher 10, showing a pair of bracket members 12 mounted to the door of a birdcage 14, shown in phantom. The bracket members 12 are secured to the cage door 14 with a bolt 18 and wing nut 16.

Figure 2:
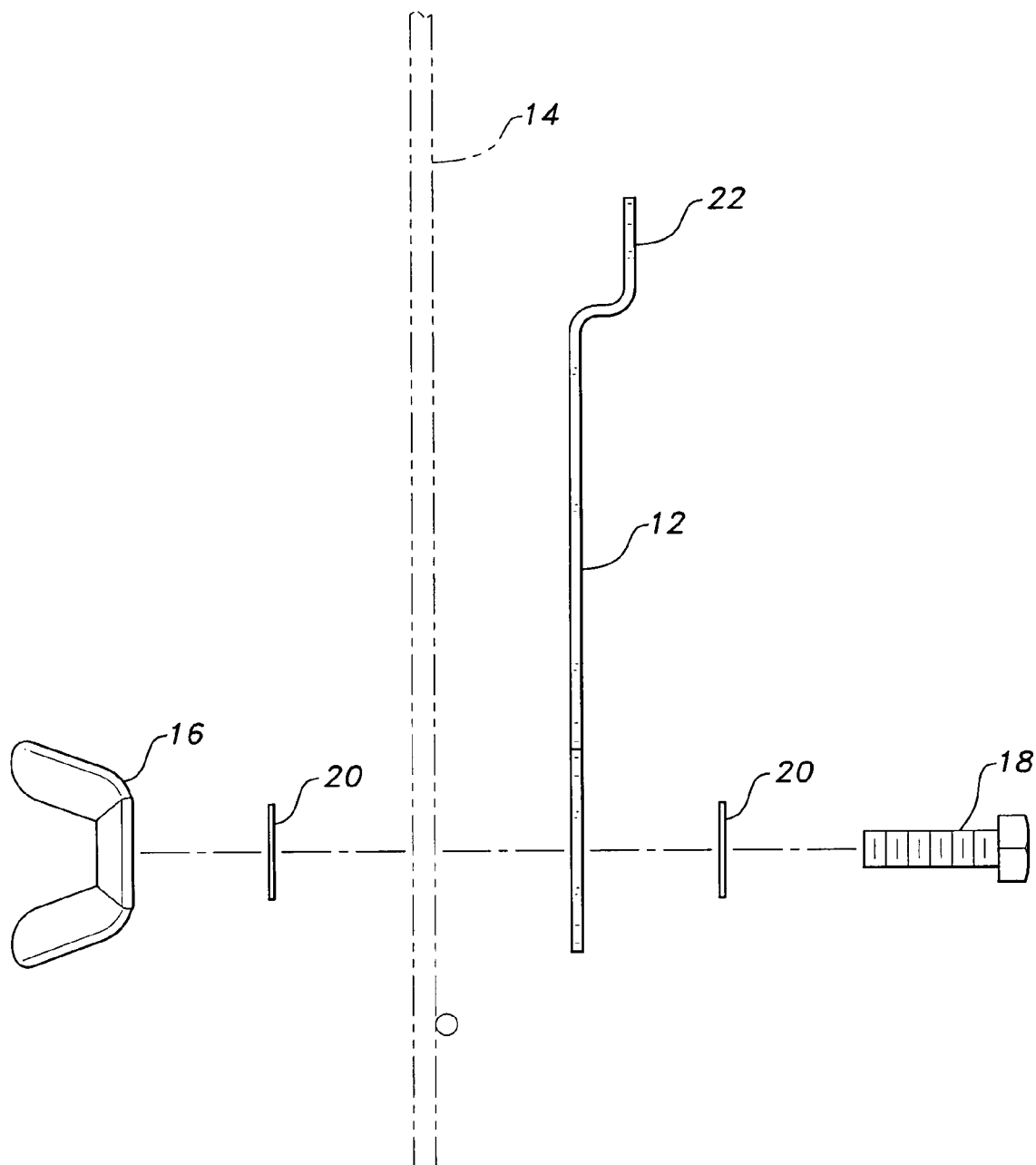
FIG. 2 is an exploded side view of a bracket member of a bird waste catcher for cage door according to the present invention.

FIG. 2 shows the bracket member 12 having an outwardly turned upper edge that defines a lip 22. The mounting configuration is shown with the bolt 18 securing the bracket member 12 to the cage door 14 with a wing nut 16 and a pair of washers 20. The cage door 14 is shown in phantom view. As shown, each bracket member 12 preferably has a substantially inverted T-shaped contour.

Figure 3:
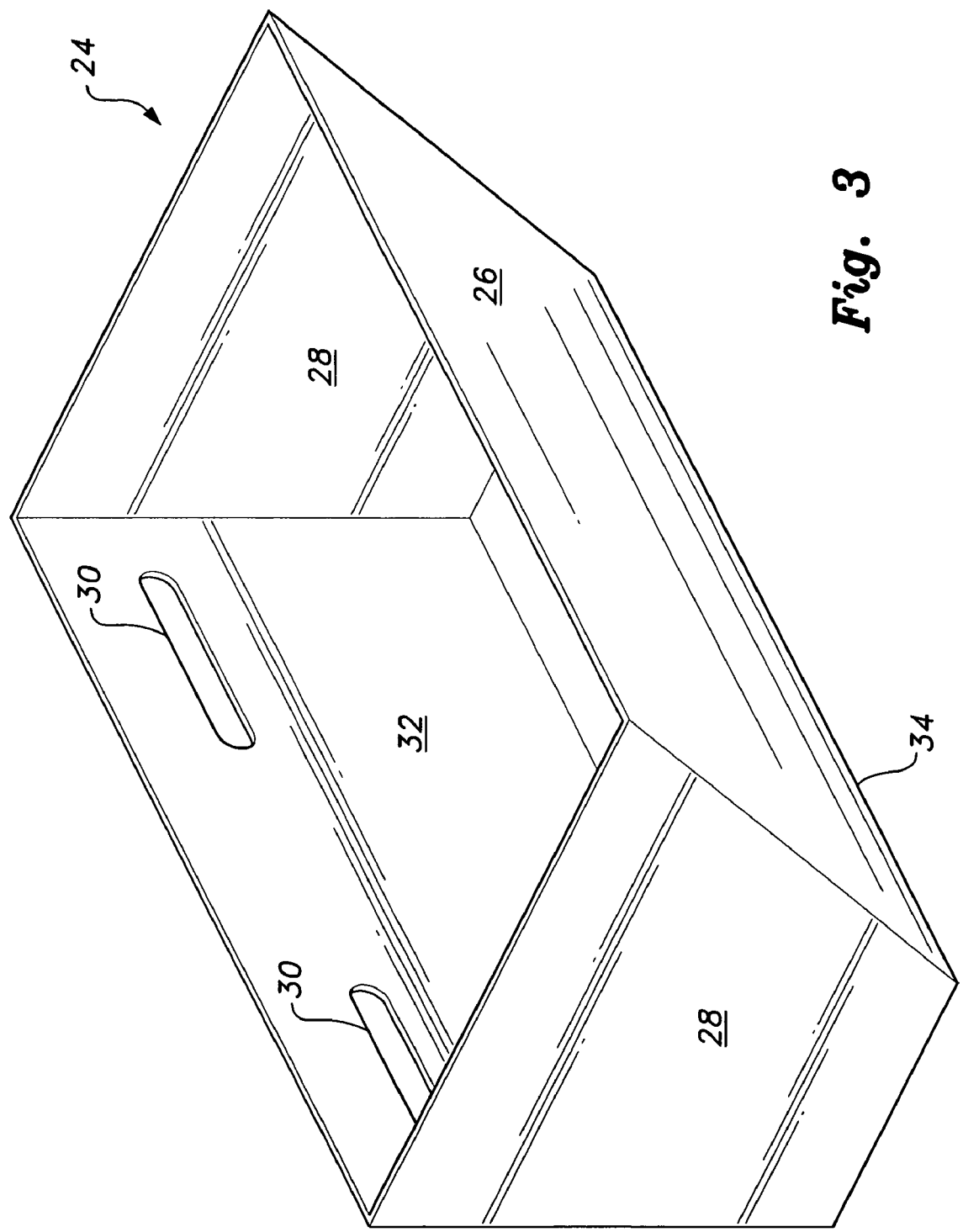
FIG. 3 is a perspective view of the receptacle of a bird waste catcher for cage door according to the present invention.

FIG. 3 is a perspective view of the receptacle 24. The receptacle 24 has an open top end and a substantially trapezoidal shape. The front surface 26 slants outward for maximum coverage. The receptacle 24 has a bottom surface 34, a pair of opposing sidewalls 28 and a rear wall 32. A pair of horizontal slots 30 are defined in the rear wall 32.

Figure 4:
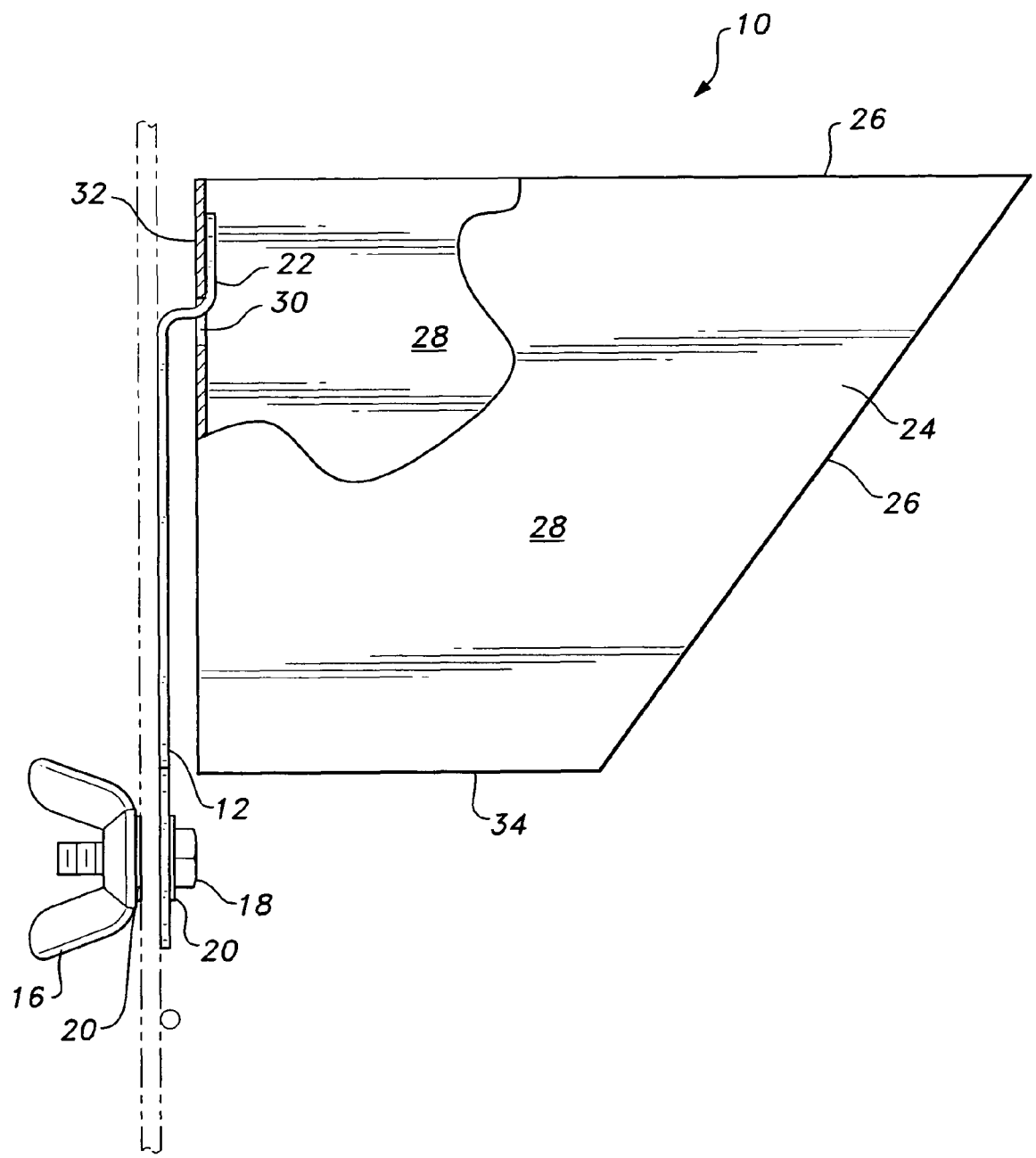
FIG. 4 is a side view of the bird waste catcher for cage door according to the present invention mounted on a birdcage door, with the receptacle broken away and partially in section to show details thereof.

FIG. 4 is a side view of the bird waste catcher 10 mounted on cage door 14, shown in phantom view. The sidewall 28 is partially broken away to show the lip 22 of the bracket member 12 engaged in the slot 30 on the rear wall 32 of the receptacle 24. FIG. 4 also shows the outward slant of the front wall 26.

Figure 5:
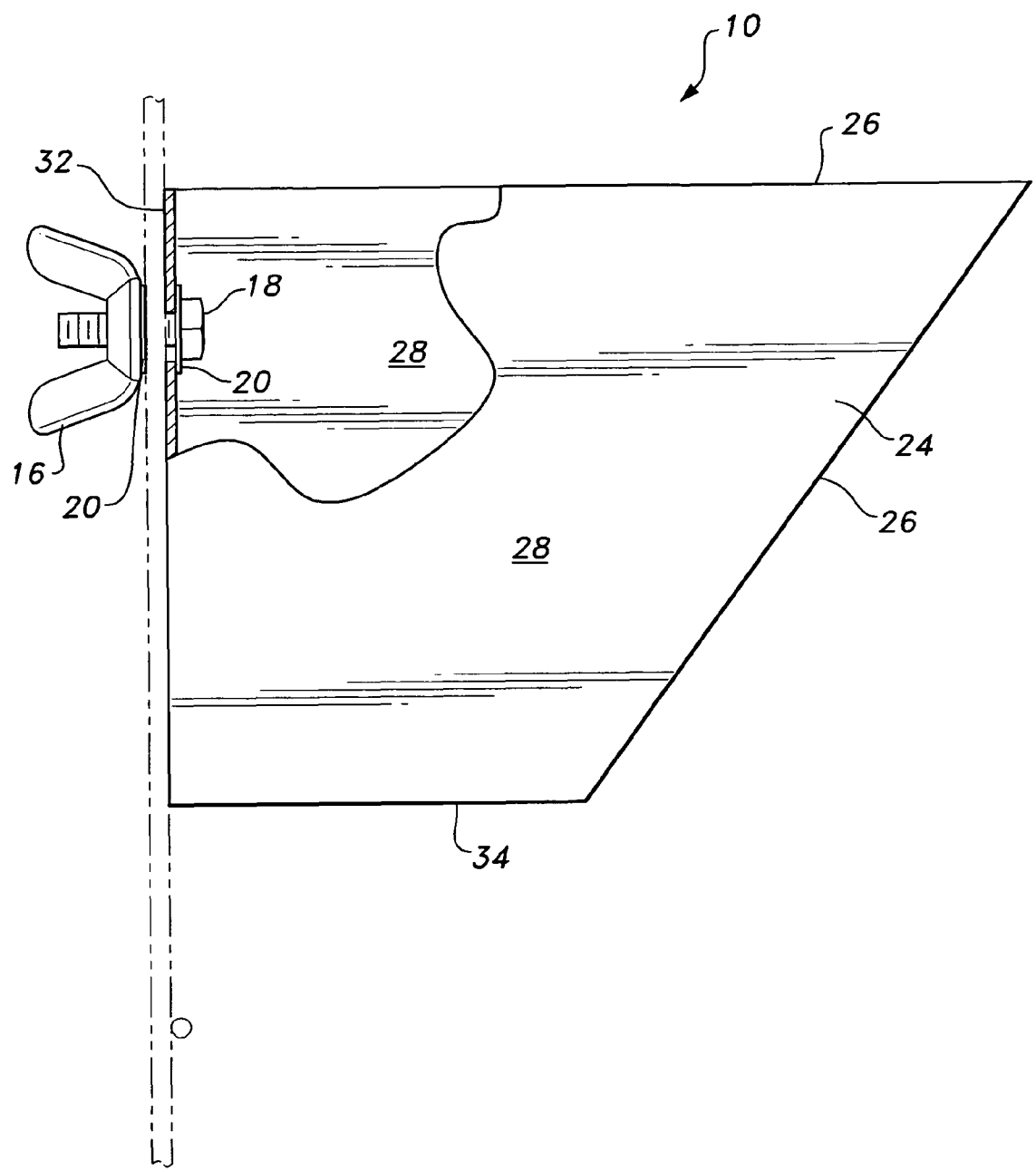
FIG. 5 is a side view of an alternative embodiment of the bird waste catcher for cage door mounted on a birdcage door, with the receptacle broken away and partially in section to show details thereof.

In use, receptacle 24 is mounted to the door of the birdcage, suspended by lips 22 of bracket members 12, for receiving waste when the bird is perched on the top of the door 14. The receptacle 24 is easily removable (by sliding lips 22 out of respective slots 30) for cleaning, once the receptacle 24 has been filled with the bird's droppings. The large, open upper end of receptacle 24 provides a wide space for receiving the droppings, with the sloping front wall 26 not only providing maximal coverage for receiving droppings, but also providing a surface upon which the droppings may slide, to be retained on the lower wall 34 of the receptacle 24. Both the receptacle 24 and the bracket members 12 may be easily removed from the birdcage for cleaning, transport or replacement thereof. Alternatively, as shown in FIG. 5, the bracket members 12 may be removed, and the receptacle 24 may be secured directly to the door 14, using bolt 18, which passes through an opening formed through wall 32, which engages nut 16, and may include washers 20, as above.

It is to be understood that the present invention is not limited to the embodiment described above, but encompasses any and all embodiments within the scope of the following claims.

I claim:

1. A bird waste catcher for a cage door, comprising:
    a plurality of bracket members, each of the bracket members having an upper portion and a lower portion, the lower portion thereof having a plurality of mounting holes defined therein, the upper portion extending upwardly from the lower portion and having an outwardly turned upper edge defining a lip;
    a trapezoidal receptacle having an open top, a bottom surface, an outwardly slanting front wall, a back wall and a pair of opposing sidewalls, the back wall having a plurality of slots defined therein removably receiving the lips on the bracket members; and
    a plurality of fasteners for securing the bracket members to the door of a birdcage.

2. The bird waste catcher for a cage door as recited in claim 1, wherein the fasteners comprise a bolt and a wing nut.

3. The bird waste catcher for a cage door as recited in claim 2, further comprising a washer disposed between the bolt and the wing nut.

4. The bird waste catcher for a cage door as recited in claim 1, wherein the bracket members have an inverted "T" shape.

5. The bird waste catcher for a cage door as recited in claim 1, wherein each of the slots extends along a substantially horizontal direction.

6. A bird waste catcher for a cage door, comprising:
    a plurality of bracket members, each of the bracket members having an upper portion and a lower portion, the lower portion having at least one mounting hole defined therein, the upper portion extending upwardly from the lower portion and having an outwardly turned upper edge defining a lip, each of the bracket members having an inverted T-shape;
    a receptacle having an open top end, a bottom surface, an outwardly slanting front wall, a back wall and a pair of opposing sidewalls, the back wall having a plurality of slots defined therein, the lips of the bracket members extending through corresponding slots; and
    a plurality of fasteners releasably securing the bracket members to the door of a birdcage.

7. The bird waste catcher for a cage door as recited in claim 6, wherein the fasteners comprise bolts and mating wing nuts, the bolts extending through the at least one mounting hole.

8. The bird waste catcher for a cage door as recited in claim 7, further comprising at least one washer received between the bolts and the wing nuts.

9. The bird waste catcher for a cage door as recited in claim 6, wherein each of the sidewalls of said receptacle is substantially trapezoidal.

10. The bird waste catcher for a cage door as recited in claim 6, wherein each of the slots extends along a substantially horizontal direction.

* * * * *